June 5, 1928.
C. J. YOUNG
PHOTO ELECTRIC PHOTOMETER
Filed Jan. 20, 1927
1,672,671
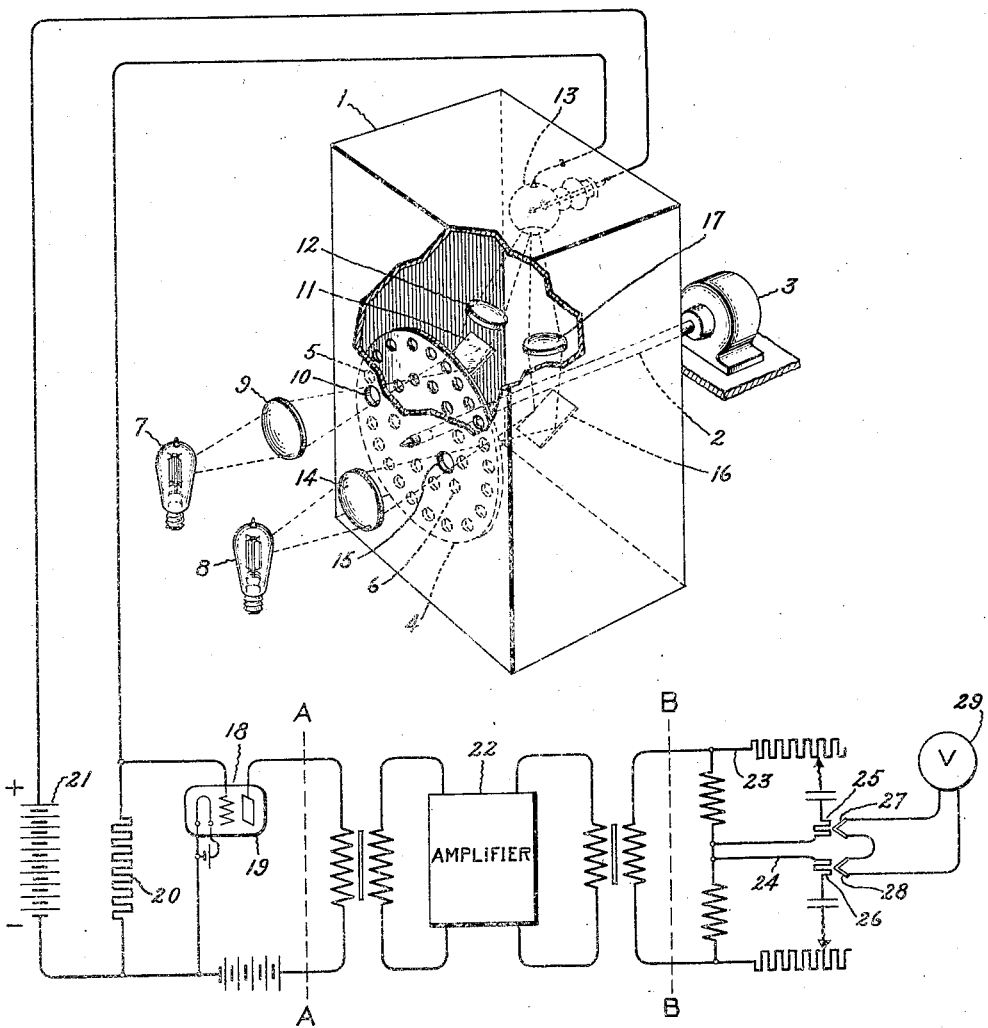
Inventor:
Charles J. Young.
by
His Attorney.

Patented June 5, 1928.

1,672,671

UNITED STATES PATENT OFFICE.

CHARLES J. YOUNG, OF SCHENECTADY, NEW YORK, ASSIGNOR TO GENERAL ELECTRIC COMPANY, A CORPORATION OF NEW YORK.

PHOTO-ELECTRIC PHOTOMETER.

Application filed January 20, 1927. Serial No. 162,405.

My present invention relates to an arrangement for comparing the illuminating power of a plurality of beams of light.

It is one of the objects of my invention to provide a system employing a light sensitive cell for effecting an accurate comparison of the illuminating power of a plurality of beams of light which shall be independent of variations either in the light sensitive cell itself or in the source of power connected to the source of light.

In carrying the invention into effect a single light sensitive cell is employed and a plurality of beams of light are directed on to this cell to thereby produce currents through the cell proportional to the illuminating power of each beam. Each light beam is periodically interrupted, the number of interruptions of one beam in a given time being greater than the number of interruptions of another beam in the same time. The currents thus produced in the light sensitive cell control the potential of the control element of an electron discharge device and produce a current in the output circuit thereof composed of components having frequencies proportional to the number of interruptions of each light beam. This current is supplied to circuits resonant at the frequencies of the components and controlling an indicating device.

The novel features which I believe to be characteristic of my invention are set forth with particularity in the appended claims. My invention itself, however, will best be understood from reference to the following specification when considered in connection with the accompanying drawing in which the single figure represents or shows diagrammatically a circuit organization and arrangement of parts whereby my invention may be carried into effect.

Referring to the drawing, I have indicated at 1, a box or container within which is mounted a shaft 2 driven by a motor 3 of any suitable type and reasonably constant speed. Shaft 2 carries at one end thereof and adjacent a side of the container a circular perforated disk 4. Disk 4 is provided with an outer ring of holes 5 and with an inner concentric ring 6, the number of holes in the outer ring being considerably greater than the number of holes in the inner ring. Two light sources, one of which 7 may be taken as a standard and the other 8 as a variable source, are mounted on the outside of box 1. Light from source 7 is directed through a lens 9, an opening 10, and the inner ring holes 6 on to a reflecting mirror 11 and then through lens 12 upon the light sensitive cell 13 which in the present instance is a photo-electric cell. Light from the source 8 is directed through a lens 14, opening 15 and the openings of ring 5 on to a reflecting mirror 16 and then through a lens 17 on to the light sensitive cell.

Cell 13 is connected to the control element 18 of an electron discharge device 19 which is used as an amplifier. A potential is normally impressed on the cell through a resistor 20 by a source of energy 21. The control element is normally negative but as light is directed onto the cell 13 and current flows through the cell and resistor 20 the negative charge on control element 18 is reduced, and increased current flows in the output circuit of the discharge device. This output circuit is connected to an amplifier 22 which excites a pair of circuits 23 and 24 tuned to be resonant at certain frequencies. Heater elements 25 and 26 are connected in circuits 23 and 24 respectively and are adapted to heat a pair of thermo-electric couples 27 and 28 which are connected in opposition to one another and in circuit with an indicator or meter 29.

In the operation of the device shown, when disk 4 is rotated, the light beam from source 7 is interrupted periodically about five hundred times per second and that from source 8 about nine hundred times per second. The variations in the potential of the grid 18 produced by the current flowing through cell 13 cause corresponding variations in the current flowing in the output circuit of the discharge device. The form of the current wave may be controlled by the form of the openings in the disk 4 or by the form of the openings 10 and 15. In the present instance the wave is of complex form, including a steady component and superimposed on this two waves of substantially sine form, one having a frequency of five hundred and the other of nine hundred cycles per second. The tuned circuits 23 and 24 are resonant at frequencies of five hundred cycles and nine hundred cycles per second and when current of these frequencies flows in the tuned circuits the heater elements 25 and 26 are energized. If the amounts of light directed on to the light sensitive cell 13 from each of the sources of light 7 and 8 are equal, the currents flowing in the heater elements will be equal and since the thermoelectric elements are connected in opposition no indication will be registered on the indicating device 29. If, however, the amounts of light directed on to the light sensitive cell are unequal, elements 25 and 26 will be heated unequally, the thermoelectric junctions will be heated unequally, and the pointer associated with the indicating device will be moved to the right or left to give an indication of the relative intensity of the two light sources.

If the variations of current flowing in the output circuit of the discharge device are relatively large the portions of the circuit included between the dotted lines $a$—$a$ and $b$—$b$ may be omitted if desired and the current supplied directly to the tuned circuits 23 and 24 rather than to an amplifier.

When the light densities of two samples of material are to be compared the light sources 7 and 8 are replaced by these samples and the samples illuminated from another and preferably a single source of illumination. The operation of the remainder of the equipment is the same as described above. It is obvious that the ability of two samples to reflect light can be compared in an analogous manner and with no alteration in the principle employed.

What I claim as new and desire to secure by Letters Patent of the United States is:—

1. The combination in a system for comparing the illuminating power of different light beams, of a light sensitive cell, means for directing the light beams on to said cell, means for periodically interrupting one light beam at a predetermined frequency, means for periodically interrupting another light beam at a different predetermined frequency, and means for comparing the intensity of the current produced in the cell by one light beam with the intensity of the current produced in the cell by another light beam.

2. The combination in a system for comparing the illuminating power of different light beams, of a light sensitive cell, means for directing the light beams on to said cell, means for periodically interrupting one light beam at a predetermined frequency, means for periodically interrupting another light beam at a different predetermined frequency, and means for comparing the intensity of the current produced in the cell by one light beam with the intensity of the current produced in the cell by another light beam, said means comprising a plurality of tuned circuits connected to the light sensitive cell.

3. The combination in a system for comparing the illuminating power of different light beams, of a light sensitive cell, means for directing the light beams on to said cell, means for periodically interrupting one light beam at a predetermined frequency, means for periodically interrupting another light beam at a different predetermined frequency, means for comparing the intensity of the current produced in the cell by one light beam with the intensity of the current produced in the cell by another light beam, said means comprising an electron discharge device connected to said light sensitive cell, and a plurality of tuned circuits connected to the electron discharge device.

4. In combination, a plurality of light sources, means for comparing the illuminating power of said sources, said means comprising an electron discharge device having an output circuit and a control element, a single light sensitive cell connected to the control element and adapted to receive light from said sources, means for periodically interrupting the light from each source to thereby vary the potential of said control element, the number of interruptions of the light from one source being greater than the number of interruptions of the light from the other source to thereby produce a current in said output circuit having components of different frequencies, a plurality of circuits resonant to said frequencies, and means responsive to the current in said circuits for controlling an indicating device.

5. In combination, a plurality of light sources, means for comparing the illuminating power of said sources, said means comprising an electron discharge device having an output circuit and a control element, a single light sensitive cell connected to the control element and adapted to receive light from said sources, means for periodically interrupting the light from each of said sources to thereby vary the potential of said control element, the number of interruptions of the light from one source being greater than the number of interruptions of the light from the other source to thereby produce a current in said output circuit having components of different frequencies, a plurality of circuits resonant to said frequencies, a pair of thermoelectric junctions oppositely connected to an indicating element, and heating elements connected in each of said resonant circuits and adapted to control the operation of said thermoelectric junctions.

6. In combination, an electron discharge device having an output circuit and a control electrode, a light sensitive cell connected to the control electrode, means for directing a plurality of light beams on to said cell to cause a current to flow therethrough, means for periodically interrupting the light beams to thereby vary the potential of the control electrode and produce a current in said output circuit, said current comprising two components of different frequencies, a plurality of circuits associated with said output circuits and resonant to said frequencies, and an indicating device responsive to current flowing in said resonant circuits.

7. The method of comparing the illuminating power of different light beams which comprises generating an electromotive force comprising components of different frequencies, each component having a value proportional to the illuminating power of one beam, supplying said electromotive force to circuits resonant at said frequencies and controlling an indicating device in accordance with the current flowing in each of said resonant circuits.

In witness whereof, I have hereunto set my hand this 18th day of January, 1927.

CHARLES J. YOUNG.